Figure 5:
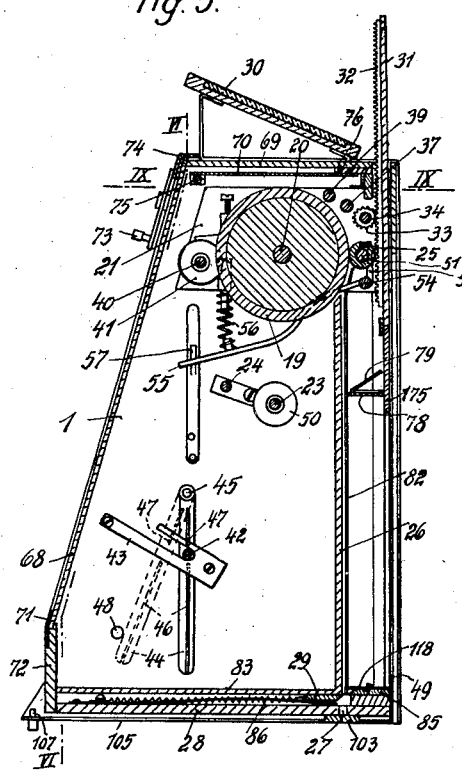

Dec. 19, 1933.    W. SALCHOW    1,940,187
DARK SLIDE FOR PHOTOGRAPHIC APPARATUS
Filed Oct. 8, 1931    5 Sheets-Sheet 1
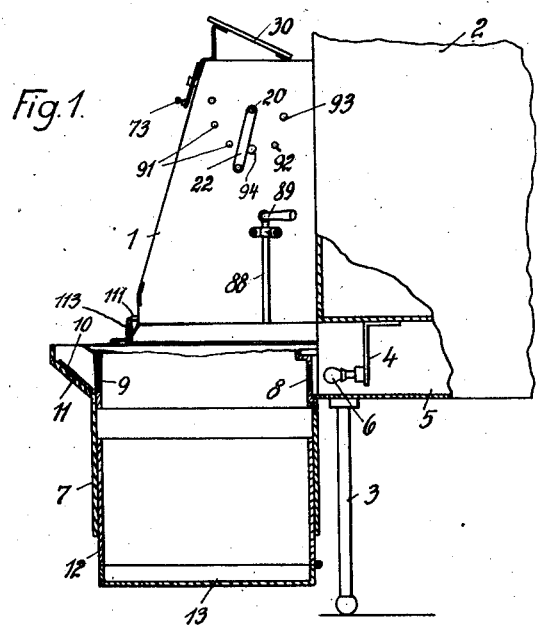
Inventor:
Willy Salchow
by [signature]
Atty.

Dec. 19, 1933.  W. SALCHOW  1,940,187
DARK SLIDE FOR PHOTOGRAPHIC APPARATUS
Filed Oct. 8, 1931  5 Sheets-Sheet 2
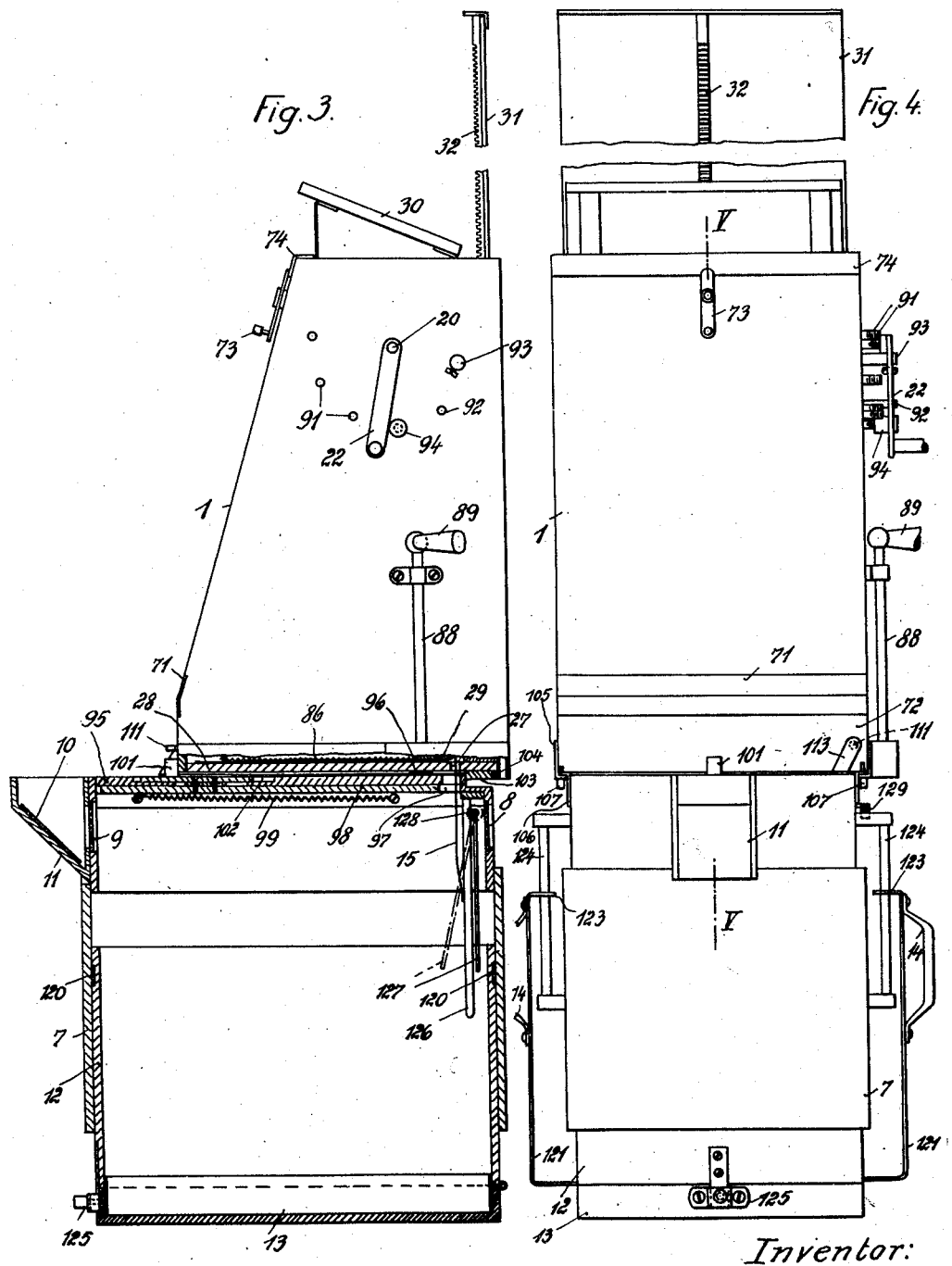
Inventor:
Willy Salchow
by Karlkrinhainer
Atty.

Dec. 19, 1933.   W. SALCHOW   1,940,187
DARK SLIDE FOR PHOTOGRAPHIC APPARATUS
Filed Oct. 8, 1931   5 Sheets-Sheet 3

Inventor:
Willy Salchow
by Karl Weinheimer
Atty.

Dec. 19, 1933.  W. SALCHOW  1,940,187
DARK SLIDE FOR PHOTOGRAPHIC APPARATUS
Filed Oct. 8, 1931   5 Sheets-Sheet 4
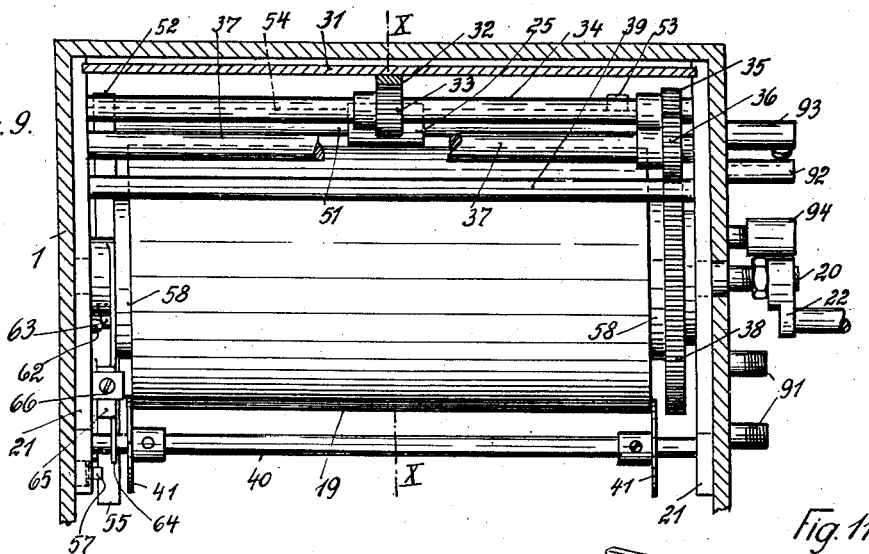
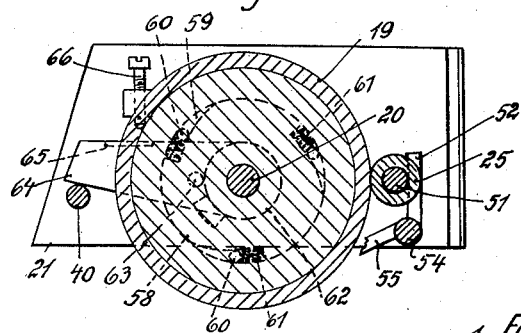
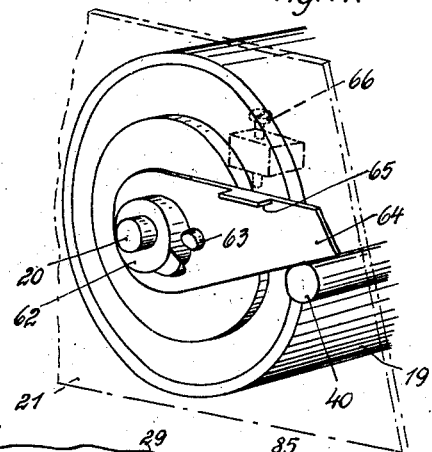
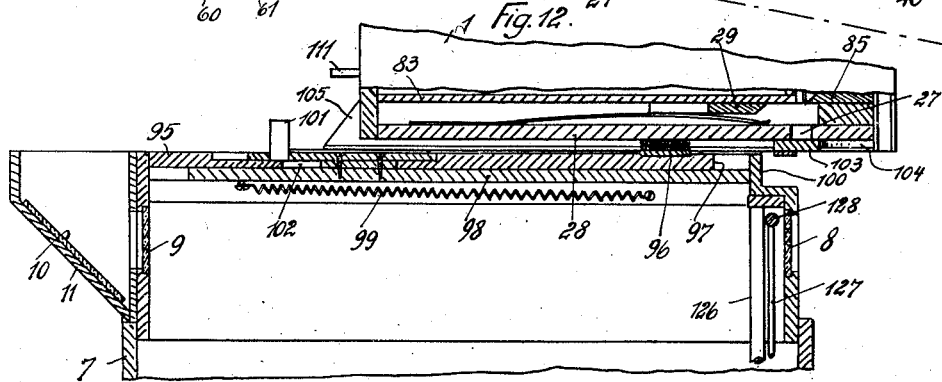
Inventor:
Willy Salchow
by *Karl...*
Atty.

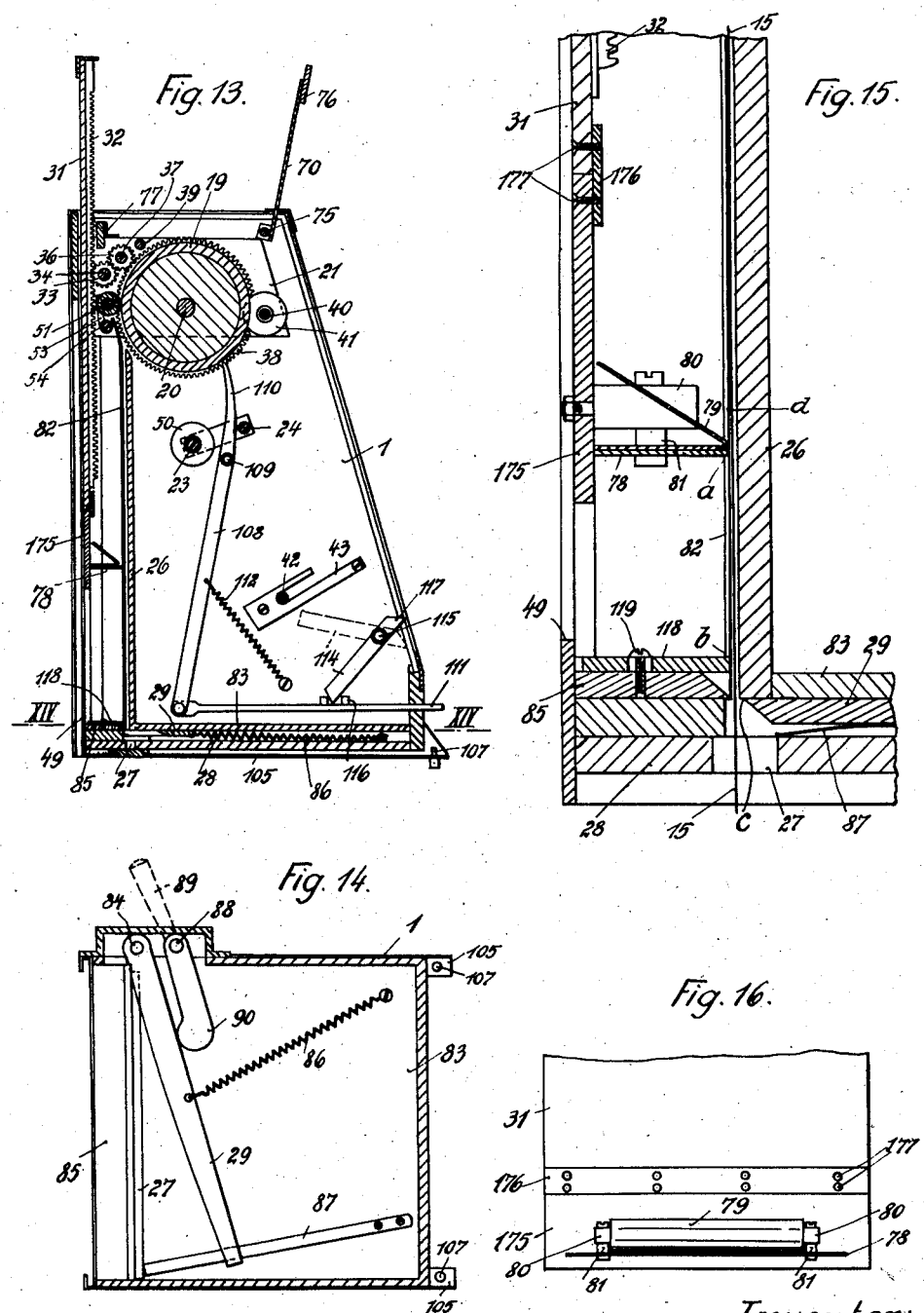

Patented Dec. 19, 1933

1,940,187

UNITED STATES PATENT OFFICE 1,940,187

DARK SLIDE FOR PHOTOGRAPHIC APPARATUS

Willy Salchow, Berlin-Tempelhof, Germany

Application October 8, 1931, Serial No. 567,625, and in Germany August 8, 1928

20 Claims. (Cl. 95—34)

My invention relates to dark slides for photographic apparatus, and more particularly apparatus for photographing what is known as "copy", i.e., letters, documents, maps, book pages and the like.

It is an object of my invention to provide an improved dark slide for an apparatus of this type.

It has already been suggested to so design a dark slide that reciprocating covering plate for exposing the sensitized material in the dark slide, entrains a supply of sensitized material, normally paper, from a supply.

According to my invention separate means are provided for reciprocating the covering plate and for feeding the sensitized material which means are operatively but not positively connected so that the covering plate and the feeding mechanism under certain conditions move independently of each other. This may be effected by a one-way clutch connecting the means for reciprocating the covering plate and the means for feeding the sensitized material so that the feed is not positively connected to the reciprocation of the covering plate. In this manner the covering plate is permitted to move upwards without interfering with the feeding means while on its down stroke it is connected to the feeding means which supplies a fresh sheet of paper or other material for the next exposure.

Other objects of my invention will appear from the following detailed description.

My invention will be described as adapted to a dark slide in which sensitized paper is fed past the opening exposed by the covering plate of the dark slide but it is understood that I am not limited to sensitized paper but that any other suitable material, for instance, a transparent or opaque bearer with a sensitized layer thereon, may be fed through the dark slide.

In the drawings affixed to this specification and forming part thereof a dark slide embodying my invention and its accessories are illustrated diagrammatically by way of example.

In the drawings

Fig. 1 is a partly sectional elevation showing the dark slide and the collector for the exposed sheets, as attached to a camera, Fig. 2 is a partly sectional side elevation of the dark slide with one of its side walls removed, drawn to a larger scale, Fig. 3 is a side elevation of the dark slide and a vertical section of the collector for the exposed sheets.

Figure 6:
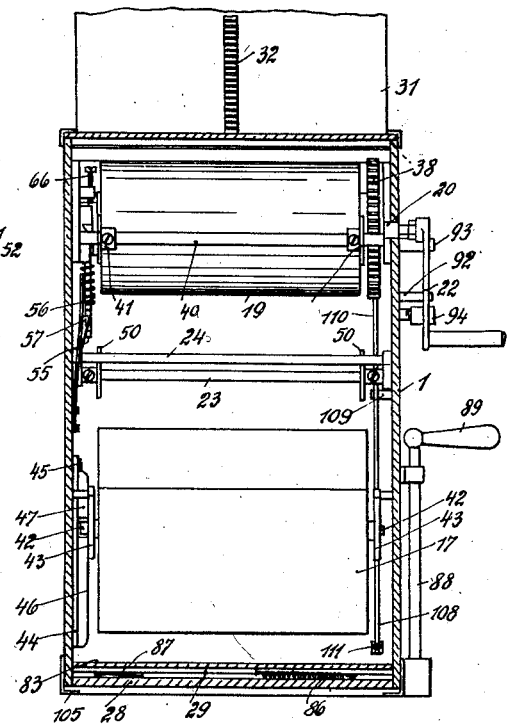
Figure 7:
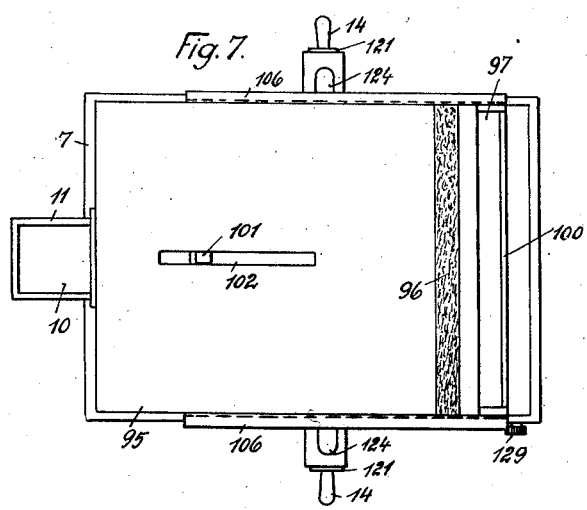
Figure 8:
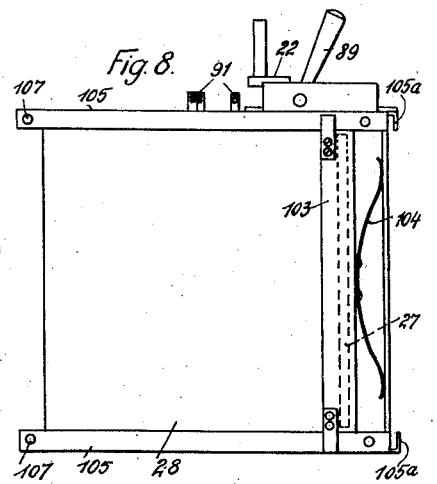

Fig. 4 is a front end elevation of the dark slide and the collector, as the operator sees them, Fig. 5 is a section of the dark slide on the line V—V in Fig. 4, Fig. 6 is a section on the line VI—VI in Fig. 5, Fig. 7 is a plan view of the collector, Fig. 8 is a plan view of the dark slide, viewed from below, Fig. 9 is a section on the line IX—IX in Fig. 5, drawn to a larger scale, Fig. 10 is a section on the line X—X in Fig. 9, Fig. 11 is a perspective illustration showing a detail of the feed cylinder for the sensitized paper, Fig. 12 is a partly sectional elevation illustrating the connection of the collector to the base of the dark slide, Fig. 13 is a section of the dark slide, taken on the line V—V in Fig. 4 but viewed from the opposite side, Fig. 14 is a section on the line XIV—XIV in Fig. 13, Fig. 15 is a vertical section of the closing plate of the dark slide showing a detail, and Fig. 16 is an end elevation of a portion of Fig. 15.

Referring now to the drawings, and first to Fig. 1, the dark slide 1 is attached to the photographic apparatus 2 by any suitable means, for instance, the strips 105a, Fig. 8. The apparatus itself will not be described as it forms no part of the present invention. It is erected on a frame one leg of which is indicated at 3. 4 is a lamp bracket in a suitable compartment 5 of the apparatus, 6 is a lamp on the bracket, 7 is a collector for the exposed sheets which is attached to the base of the dark slide 1, 8 is an opening in the rear wall of the collector opposite the lamp 6, 9 is an opening in its front wall in line with the opening 8, and 10 is a mirror arranged at an angle of 45 degs. opposite the opening 9 in a suitable frame 11. Panes of ruby glass or other suitable inactinic material are inserted in the openings 8 and 9.

The sheets of paper which are fed through the dark slide, severed at the bottom of the dark slide, and delivered to the collector 7 in a manner which will be described, move past the opening 8 and obstruct it so that the image of the lamp 6 is not visible in the mirror 10. As the severed sheets fall into the collector 7 they expose the opening 8 and the image of the lamp 6 appears again on the mirror 10. In this manner the image alternately appears and disappears in the normal operation of the feed. If the image appears permanently on the mirror 10, this indicates that the paper is not fed properly or that the supply has become exhausted while, if it disappears permanently, this indicates that the collector is filled, as the last sheet which has been severed cannot move down and permanently obstructs the opening 8.

12 is a receptacle with a hinged bottom flap 13 which is mounted to telescope in the collector 7, and 14, Fig. 4, are handles at the sides of the receptacle 12 by which it is moved up and down in the collector. The details of the collector will be described below.

The arrangement of the supply of sensitized paper and the way in which the paper is moved through the dark slide, will best be understood by referring to Fig. 2. 15 is a roller of sensitized paper which is mounted on a suitable shaft or cylinder 16 in a light-excluding casing 17. The casing 17 is supported on trunnions as will be described. 18 is a slot in the top wall of the casing 17 through which the sensitized sheet 15 leaves the casing. Suitable means, not shown, for instance, a strip of plush or velvet, are provided at the slot for preventing light from getting into the casing 17 when the dark slide is opened in full daylight or other actinic light, for removing trouble with the paper, or for any other operation. If the strip at the slot 18 were not provided it would be necessary to take the dark slide to the dark room for opening it.

The shaft or cylinder 16 on which the supply of sensitized paper 15 is supported in the casing 17 has trunnions 42, Fig. 6, which project from opposite ends of the casing. The trunnions engage in slotted bearings 43 at the side walls of the dark slide, and 44 are locking members pivoted at 45 on the side walls for retaining the trunnions in the slotted bearings 43. As will appear from Fig. 5 the locking members, or one of them, are provided with inwardly projecting ribs 46 and the ribs are cut away at 47 as shown in the dotted lines position of the member in Fig. 5. The locking members are free to rotate on their pivots 45 under the action of gravity and normally are held in vertical position as shown in full lines in Fig. 5. In this position the cut-away portions of the rib register with the slots of the bearings 43 and the trunnions 42 are free to move in the slots. This is not detrimental as the slotted bearings are inclined and the trunnions are held at the bases of their slots by gravity. If, however, the dark slide is inclined the locking members will tend to conserve their vertical position and thereby, with respect to the dark slide, will move into the inclined position shown in Fig. 5, or into an intermediate position. 48 is a stop for limiting the relative rocking movement of the dark slide and the corresponding locking member 44. It will appear that as soon as a locking member moves relatively out of the full-lines position the cutaway portion 47 of its ribs 46 no longer registers with the slot in the bearing 43 so that the trunnions 42 are now retained and unintentional coming out of the trunnions 42 is prevented.

19, Fig. 2, is a feed cylinder which is mounted to rotate freely on a shaft 20 near the top of the dark slide in a suitable frame 21. 22 is a crank on the shaft 20. The rotation of the shaft 20 Fig. 9 is transmitted to the feed cylinder 19 by two one-way clutches, as will be described. The cylinder 19 is preferably equipped with a friction lining of rubber or other suitable material.

The sensitized sheet 15 after leaving the casing 17 is conducted past a pair of stretching rollers 23 and 24 which remove its tendency to warp, whereupon it is delivered past a pressure roller 25 at the rear side of the cylinder 19, and a wall 26 with two lateral guide strips 82, by which it is held straight as will appear from Fig. 2, and finally discharged through a slot 27 in the bottom plate 28 of the dark slide. 29 is a knife or cutter which is reciprocated above the bottom plate 28 and severs the exposed sheets which are then dropped into the collector 7 and removed by opening the bottom flap 13.

31 is the covering member of the dark slide which is guided in any suitable manner along its rear wall for exposing the sheet 15 to the light from the apparatus 2. The covering member is here shown as a rigid plate but instead I might provide a roller-blind or any other suitable type of closure. 32 Fig. 5 is a rack at the rear face of the covering plate 31, and 33 is a pinion which meshes with the rack and is operatively connected to the feed cylinder 19 through gearing which will now be described.

The frame 21, Fig. 9, in which the shaft 20 of the feed cylinder 19 is mounted to rotate, has two parallel end plates which are detachably secured in the dark slide 1 so that the frame, with the mechanisms mounted thereon, is readily removed. 38 is a spur gear which is keyed on the shaft 20 so as to rotate positively therewith, 36 is a spur gear on a shaft 37 which is mounted to rotate in the frame 21 and meshes with the spur gear 38, 35 is a pinion on a shaft 34 which is also mounted to rotate in the frame 21, and 33 is another pinion at the centre of this shaft which meshes with a rack 32 at the back of the covering plate 31. The opening and closing movements of the covering plate 31 and the rotation of the cylinder 19 for feeding a sheet 15 through the distance required, are each performed during one revolution of the crank 22 in opposite directions. When the plate 31 has performed its downward stroke its lower end moves behind a sill 49 at the front end of the dark slide.

39 are stays connecting the side plates of the frame 21. 40 is a shaft arranged in front of the cylinder 19 and equipped with adjustable disks 41 at opposite ends of the cylinder which accurately engage its ends and hold the paper strictly in the prescribed path. Similar disks 50, also adjustable, are mounted at the sides of the stretching roller 23.

The pressure roller 25, Fig. 9, is shorter than the cylinder 19, and acts on the cylinder only near its centre, so that the paper is guided in the vertical central plane of the dark slide and has no tendency to depart therefrom. Means are provided for lifting the pressure roller 25 off the feed cylinder 19 as required for threading a fresh sheet of paper through the dark slide. The shaft 51 of the pressure roller 25 is mounted in the frame 21 for slight transverse displacement, for instance, by slotted bearings, 52 and 53 are two arms on a shaft 54 Fig. 5 which is also mounted in the frame 21, and equipped at one end with a lever 55. 56 is a spring which is anchored on the frame 21 and with its free end bears on the lever 55, so as to exert pressure on the shaft 51 of the roller 25. 57 is a catch at one of the side walls of the dark slide which engages below the lever 55 when it is raised against the action of the spring 56, permitting the roller 25 to recede.

It will be understood that while the covering plate 31 of the dark slide moves in opposite directions as required for opening and closing the dark slide, the feed cylinder 19 must move in one direction only. In order to permit this relative movement two one-way clutches are provided intermediate the cylinder 19 and its shaft 20 one of which is illustrated in Fig. 10. 58 is a clutching member on the shaft 20 which is provided with notches 59 for the reception of balls 60 which are equipped with springs 61. When the shaft 20 is rotated anti-clockwise the member 58 engages with the cylinder 19 while in the opposite direction of rotation it is not entrained. Obviously any other type of one-way clutching mechanism might be provided, for instance, a pair of ratchet wheels with their teeth oppositely directed, and pawls cooperating with the wheels.

Means are provided for preventing overthrowing of the feed cylinder by inertia which may occur if the crank 22 is rotated very rapidly. Such means may include a cam plate 62 on one end of the shaft 20, Fig. 11, and a pin 63 on a spring or resilient brake block 64 which is freely mounted on the shaft 20. 65 is a dog on the spring or brake block 64, 66 is an adjustable dog on the frame 21 for limiting the upward movement of the spring, and its downward movement is limited by the shaft 40. When the shaft 20 and the cam plate 62 have rotated through a given angle the cam portion of the plate strikes the cam 63 on the spring and forces the spring against the adjacent end of the cylinder 19, arresting the cylinder.

The dark slide is equipped with a detachable cover 68, Fig. 5, at its front, a sliding top plate 69 which supports the mirror 30, and a rocking top plate 70 below the sliding top plate 69. 71 is a strip for attaching the cover 68 to the rear wall 72 of the dark slide at its lower end, and 73 is a turn buckle near the upper end of the cover which engages an angle section strip 74 at the front end of the sliding top plate 69. When the turn buckle 73 is moved aside the top plate 69 with the mirror 30 can be extracted in forward direction. The rocking plate 70 is now exposed. 75 is its pivot, 76 is a strip at its free end, Fig. 13, and 77 is a frame on which the strip rests when it has been turned down. Fig. 13 shows the plate 70 in open position. The cover 68 is removed for exchanging the casing 17 with the supply of sensitized paper 15, and the two top plates 69 and 70 are opened for exposing the feed cylinder when the paper is threaded about the cylinder and the several means for guiding it.

If there is any trouble with the paper, for instance, if the paper sticks anywhere in the vicinity of the cylinder 19, the accessibility afforded by the top plates 69 and 70 may not be sufficient for removing the obstacle. Therefore the covering plate 31 is preferably divided below the lower end of the rack 32, as shown in Figs. 15 and 16. 175 is an extension which is secured to the lower end of the covering plate 31 by means of a strap 176 at the rear of the covering plate and screws 77 which are accessible from the outside. 78 is a shield or screen extending inwardly at right angles from the extension 175 into the immediate vicinity of the paper 15 so as to protect the unexposed portion of the paper from the light from above, 79 is an inclined deflector above the screen which facilitates the threading of the paper between the wall 26 and the inner edge of the screen 78, 80 are a pair of blocks which project inwardly from the extension 175, and 81 are screws extending through the blocks for holding and adjusting the screen 78 and the deflector 79.

118 is a strip similar to the screen 78 which is adjustably mounted at the base of the sill 49 on a fixed blade 85 by means of a screw 119, or by any other suitable means so that it fits the sending sheet 15.

The means for severing the paper will now be described. The paper, through the medium of the wall 26 and the pair of guiding strips 82, Fig. 13, is conducted toward the slot 27 in the bottom plate 28 of the dark slide. 83 is a partition which extends in parallel to the bottom plate 28 and is spaced therefrom for the reception of the knife or cutter 29. The knife is pivoted at 84 on the bottom plate of the dark slide, as shown in Fig. 14. 86 is a spring which tends to move the knife away from the blade 85, and 87 is a spring which tends to bend the knife in upward direction so as to hold its edge properly engaged with the edge of the blade 85. The knife might be operated directly by a lever on its pivot 84 but it is preferred to rotate it by separate means in order to prevent edging of the blade. 88 is a vertical shaft which is mounted to rotate at the right-hand side, 89 is a handle at its upper end and 90 is an arm at its lower end which projects into the compartment between the bottom plate 28 and the partition 83. By pulling the handle 89 the operator applies the arm 90 to the back of the knife and causes it to sever the exposed sheet which now is delivered to the collector 12.

It may be desirable not to utilize the entire area which is exposed by the covering plate 31. Means are therefore provided for limiting the stroke of the crank 22. Such means include a set of threaded studs 91 arranged in a circle about the axis of shaft 20, as shown in Fig. 3. The length of the studs is so determined that the crank 20 moves freely past them, and its angle corresponds to a full stroke of the covering plate 31. The ends of a normal stroke are determined by stops 92 and 93. When it is desired to limit the stroke of the covering plate 31, a threaded cap 94 is placed on one of the studs 91 which as shown in Fig. 9, projects into the arc described by the crank 22. When the crank is arrested by the stop 93 the brake block 64, Fig. 11, is applied so that further rotation of the feed cylinder 19 is prevented.

Margins of unexposed material are defined at the sides of the sheet by the guiding strips 82. It is desirable that transverse margins should also be left unexposed intermediate the several exposed areas. This is effected by causing the paper 15 to lead the covering plate 31, for instance, by equipping the pinion 33 (Fig. 9) with fewer teeth than the pinion 35. Referring to Fig. 15 in which the covering plate 31 is shown in an intermediate position, the exposed area is defined by the screen 78, point a, and the strip 118, point b.

Due to the ratio of the teeth numbers in the pinions 33 and 35 the paper when the covering plate 31 starts for its downward stroke, leads the plate for a distance which may be a—d so that the lower edge of the sheet from b to c is unexposed and forms the transverse margin. The light is cut out before the plate 31 starts for its downward stroke.

It will appear from the foregoing description that it is not necessary to provide a glass plate in the opening of the dark slide because the paper is guided very exactly by the wall 26, the strips 82, the screen 78 and the strip 118. This has the advantages that parallactic phenomena are eliminated and the accumulation of foreign matter which is favored by a glass plate, is entirely eliminated.

The means for connecting the collector 7 to the bottom of the dark slide will now be described with particular reference to Figs. 7, 8 and 12. 95 is the top plate of the collector 7 and 96 is a strip of plush or other suitable material for making a tight fit at the rear ends of the dark slide and the collector. The top plate 95 extends rearwardly not as far as the rear end wall of the collector so that here a slot 97 is exposed for registering with the slot 27 in the bottom plate of the dark slide. 98 is a slide which is mounted below the top plate 95, and 99 is a spring which tends to hold the rear end of the slide engaged with an abutment 100 at the rear end wall of the collector. 101 is a pin which extends upwards from the slide 98 through a slot 102 in the top plate 95.

Mounted to slide on the bottom plate 28 of the dark slide 1 is a strip 103 which is normally held in position to close the slot 27 by a spring 104, Fig. 8. 105 are a pair of guiding strips which extend along the sides of the dark slide below the bottom plate 28, and 106 are a pair of strips at the sides of the collector which are adapted to engage in the space between the strips 105 and the bottom plate 28.

When it is desired to place the collector 7 in position below the dark slide the strips 106 are inserted in the spaces defined by the strips 105, and the collector is pushed to the rear. Fig. 12 shows an intermediate relative position of the dark slide and the collector. When the collector is moved beyond this position the abutment 100 strikes the closing strip 103 and pushes it to the rear against the action of spring 104 until the slots 27 and 97 register. The rearward movement of the collector is limited by the pin 101. When this pin strikes the front wall of the dark slide the slide 98 is retracted and lays open the slot 97 and the collector is now pushed to the rear until the pin 101 engages with the front end of the slot 102. The parts are now connected in the proper position and the collector is ready for the reception of the severed sheets. Spring catches 107 may be provided on the strips 105 as shown in Fig. 5 which when the collector is in the proper position on the dark slide engage behind the front ends of the strips 106 on the collector.

When the collector is not in position on the dark slide 1 the feed cylinder 19 must be locked against operation. On the other hand, such means must be released automatically when the collector is in position. Locking means are illustrated in Fig. 13. 108 is a double-armed lever which is mounted to rock about a pivot 109 in the dark slide, its upper end being pointed at 110 for engaging between the teeth of the spur gear 38 on the shaft 20. 111 is a push bar which is pivoted to the lower end of the double-armed lever 108 and extends outwardly from the front wall of the dark slide, and 112 is a spring which tends to throw the pointed end of the lever 108 into the teeth of the spur gear 38. 113 is a bracket on the collector 7, Fig. 4, which if the collector is in position on the dark slide, pushes back the rod 111 and moves the pointed end 110 of lever 108 out of the teeth of the spur gear 38 so that the crank 22 on the shaft 20 is free to rotate.

Means are provided for holding the rod 111 in the position in which the lever 108 permits the rotation of the spur gear 38 when the dark slide is opened for inserting a casing 17 with a fresh supply of paper as in this case the cylinder 19 must be free to rotate for threading the end of the fresh sheet through the feeding means. To this end a pin 116 is provided on the bar 111 which cooperates with a pawl 114. This pawl is fulcrumed at 115 and is so designed or weighted that its lower end tends to engage behind the pin 116 by gravity when the rod 111 is moved inwardly. However, the pawl 114 is only permitted to perform this function if the front cover 68 is removed as shown in Fig. 13. If the front cover is in position it engages the short end 117 of the pawl and holds it so as to be inactive with respect to the pin 116, as shown in dotted lines.

The telescoping receptacle 12 is packed against the inner walls of the collector 7 by strips 120 of plush or other suitable material, (Fig. 3), which hold it in the position to which it is adjusted by the handles 14. The handles 14 are secured on brackets 121, Figs. 4 and 7, of resilient material, 123 are eyes at the upper end of the brackets, and 124 are guiding rods for the eyes which extend in parallel to the sides of the collector 7. The hinged bottom flap 13 is held in its closed position by any suitable means indicated at 125. 126 are guide rods which extend downwardly from the top plate of the collector 7, and 127 are strikers on a shaft 128 which extend between the rods 126 and the rear wall of the collector. 129 is a handle on the end of the shaft which projects from the casing at the right as shown in Figs. 4 and 7. When the paper sticks anywhere the shaft is rotated by the handle 129 and the strikers move the paper away from the obstacle.

I wish it to be understood that I do not desire to be limited to the exact details of construction shown and described, for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:

1. A dark slide for photographic apparatus comprising a movable covering member, means for reciprocating said member, a feed cylinder for feeding a supply of sensitized material past the opening exposed by said covering member and gearing operatively connecting said covering member to said feed cylinder and adapted to impart to said feed cylinder a peripheral velocity which is higher than the velocity at which said covering member moves.

2. A dark slide for photographic apparatus comprising a movable covering member, means for reciprocating said member, means operatively connected to said reciprocating means for feeding a supply of sensitized material past the opening exposed by said covering member, means for severing the sensitized material at the bottom of said dark slide, a collector for the reception of the severed sheets, and means under the control of said sheets for indicating the operation of said feeding means.

3. A dark slide for photographic apparatus comprising a movable covering member, means for reciprocating said member, means operatively connected to said reciprocating means for feeding a supply of sensitized material past the opening exposed by said covering member, means for severing the sensitized material at the bottom of said dark slide, a collector for the reception of the severed sheets, a mirror on said collector, a transparent plate of inactinic colour inserted in a hole of said collector opposite said mirror in such position that the severed sheets move past said plate, and a source of light for illuminating said plate from the side opposite said mirror.

4. A dark slide for photographic apparatus comprising a movable covering member, means for reciprocating said member, means operatively connected to said reciprocating means for feeding a supply of sensitized material past the opening exposed by said covering member, a casing for the reception of said supply adapted to be inserted in said dark slide, and means for extracting the material from said casing without admitting light to its interior.

5. A dark slide for photographic apparatus comprising a movable covering member, means for reciprocating said member, means operatively connected to said reciprocating means for feeding a supply of sensitized material past the opening exposed by said covering member, a casing for the reception of said supply, trunnions at opposite ends of said casings, slotted bearings in said dark slide for the reception of said trunnions, and gravity-controlled means for holding said trunnions in said bearings in the normal position of said dark slide.

6. A dark slide for photographic apparatus comprising a movable covering member, a feed cylinder for feeding a supply of sensitized material, means for rotating said feed cylinder, one-way clutching means intermediate said rotating means and said feed cylinder, gearing positively connected to said rotating means for reciprocating said member, and means for stretching the material against its warping tendency.

7. A dark slide for photographic apparatus comprising a movable covering member, a feed cylinder for feeding a supply of sensitized material, means for rotating said feed cylinder, one-way clutching means intermediate said rotating means and said feed cylinder, gearing positively connected to said rotating means for reciprocating said member, and a detachable frame in said dark slide in which said feed cylinder and the mechanism connected to it, are mounted.

8. A dark slide for photographic apparatus comprising a movable covering member, means for reciprocating said member, means operatively connected to said reciprocating means, and including a feed cylinder, a pressure roller adapted to hold the material on said feed cylinder, means for urging said roller toward said cylinder, and means for lifting it off the material; for feeding a supply of sensitized material past the opening exposed by said covering member.

9. A dark slide for photographic apparatus comprising a movable covering member, a feed cylinder for feeding a supply of sensitized material, means for rotating said feed cylinder, one-way clutching means intermediate said rotating means and said feed cylinder, gearing positively connected to said rotating means for reciprocating said member, and automatic means under the control of said rotating means for preventing overthrowing of said feed cylinder.

10. A dark slide for photographic apparatus comprising a movable covering member, means for reciprocating said member, means operatively connected to said reciprocating means for feeding a supply of sensitized material past the opening exposed by said covering member, a sliding plate for closing the upper end of said dark slide, a rocking plate below said sliding plate, and a detachable cover at the front end of said dark slide with means for holding said two plates against displacement.

11. A dark slide for photographic apparatus comprising a movable covering member, means for reciprocating said member, means operatively connected to said reciprocating means for feeding a supply of sensitized material past the opening exposed by said covering member, a detachable extension at the lower end of said member, and a screen on said extension which extends inwardly as far as the material.

12. A dark slide for photographic apparatus comprising a movable covering member, means for reciprocating said member, means operatively connected to said reciprocating means for feeding a supply of sensitized material past the opening exposed by said covering member, a detachable extension at the lower end of said member, a screen on said extension which extends inwardly as far as the material, and an inclined deflector at the upper side of said screen.

13. A dark slide for photographic apparatus comprising a movable covering member, means for reciprocating said member, means operatively connected to said reciprocating means for feeding a supply of sensitized material past the opening exposed by said covering member, a fixed blade at the bottom of said dark slide, a movable blade adapted to cooperate with said fixed blade, and a strip on the top of said fixed blade which extends as far as the material.

14. A dark slide for photographic apparatus comprising a movable covering member, means for reciprocating said member, means operatively connected to said reciprocating means for feeding a supply of sensitized material past the opening exposed by said covering member, a fixed blade at the bottom of said dark slide, a movable blade mounted to rock in said dark slide for cooperation with said fixed blade, a shaft mounted to rotate on said dark slide, an arm on said shaft adapted to engage the back of said movable blade, and means for rotating said shaft.

15. A dark slide for photographic apparatus comprising a movable covering member, a feed cylinder for feeding a supply of sensitized material, means for rotating said feed cylinder, one-way clutching means intermediate said rotating means and said feed cylinder, gearing positively connected to said rotating means for reciprocating said member, and means for limiting the rotation of said rotating means.

16. A dark slide for photographic apparatus comprising a movable covering member, means for reciprocating said member, means operatively connected to said reciprocating means for feeding a supply of sensitized material past the opening exposed by said covering member, means for severing the sensitized material at the bottom of said dark slide, a collector for the reception of the severed sheets, and means in said collector for deflecting sheets if they stick in the collector.

17. A dark slide for photographic apparatus comprising a movable covering member, means for reciprocating said member, means operatively connected to said reciprocating means for feeding a supply of sensitized material past the opening exposed by said covering member, means for severing the sensitized material at the bottom of said dark slide, a collector adapted to be secured to the bottom of said dark slide for the reception of the severed sheets, and automatic means for holding said collector in the proper position with respect to said dark slide.

18. A dark slide for photographic apparatus comprising a movable covering member, means for reciprocating said member, means operatively connected to said reciprocating means for feeding a supply of sensitized material past the opening exposed by said covering member, means for severing the sensitized material at the bottom of said dark slide, a collector adapted to be secured to the bottom of said dark slide for the reception of the severed sheets, and automatic means which are arranged to prevent the entrance of light through the slots of the dark slide and the collector when they are separated from each other.

19. A dark slide for photographic apparatus comprising a movable covering member, means for reciprocating said member, means operatively connected to said reciprocating means for feeding a supply of sensitized material past the opening exposed by said covering member, means for severing the sensitized material at the bottom of said dark slide, a collector for the reception of the severed sheets, and means which allow enlarging the space available in the collector.

20. A dark slide for photographic apparatus comprising a movable covering member, means for reciprocating said member, means operatively connected to said reciprocating means for feeding a supply of sensitized material past the opening exposed by said covering member, means for severing the sensitized material at the bottom of said dark slide, and a collector for the reception of the severed sheets.

WILLY SALCHOW.